United States Patent [19]

Karamon

[11] Patent Number: 4,921,763
[45] Date of Patent: May 1, 1990

[54] SOFT MAGNETIC THIN FILM
[75] Inventor: Hideaki Karamon, Miyagi, Japan
[73] Assignee: Sony Corporation, Tokyo, Japan
[21] Appl. No.: 279,244
[22] Filed: Dec. 1, 1988

Related U.S. Application Data

[63] Continuation-in-part of Ser. No. 116,252, Nov. 3, 1987, abandoned.

[30] Foreign Application Priority Data

Nov. 6, 1986 [JP] Japan ................................ 61-264698

[51] Int. Cl.$^5$ ............................................ H01F 10/00
[52] U.S. Cl. .................................... 428/692; 148/304; 148/305; 204/192.2; 428/900
[58] Field of Search ................ 148/304, 305; 428/692, 428/900, 678, 685; 204/192.2

[56] References Cited

U.S. PATENT DOCUMENTS

| | | | |
|---|---|---|---|
| 4,298,409 | 11/1981 | DeCristofaro et al. | 148/108 |
| 4,450,206 | 5/1984 | Ames et al. | 148/304 |
| 4,473,401 | 9/1984 | Masumoto et al. | 148/304 |
| 4,473,713 | 9/1984 | Nathasingh et al. | 148/305 |
| 4,587,507 | 5/1986 | Takayama et al. | 148/304 |
| 4,623,408 | 11/1986 | Karamon | 148/304 |

Primary Examiner—Paul J. Thibodeau
Attorney, Agent, or Firm—Hill, Van Santen, Steadman & Simpson

[57] ABSTRACT

The present invention provides, by combining as the composition of the soft magnetic thin film transition metals and two different kinds of metalloid (semiconductor) elements, herein B, C and Si, a novel amorphous soft magnetic thin film having a structure wherein two phases, namely the ferromagnetic amorphous phase and the non-magnetic amorphous phase and finely dispersed for realizing a soft magnetic thin film that is superior in high frequency characteristics and that may be applied to the magnetic head technology for short wavelength recording that may be advantageously employed with a high coercive force medium.

7 Claims, 6 Drawing Sheets

SOFT MAGNETIC THIN FILM

This is a continuation-in-part of Ser. No. 116,252, filed Nov. 3, 1987, now abandoned.

BACKGROUND OF THE INVENTION

1. Field of the Invention

This invention relates to a soft magnetic thin film employed as the core material for magnetic heads. More particularly, it relates to a novel amorphous soft magnetic thin film having a high magnetic flux density and a high electrical resistance.

2. Related Art Statement

In magnetic recording and/or reproducing apparatus, such as video tape recorders or VTRs, it has been tried to improve the image quality, for instance, by elevating the recording density and/or the frequency of record signals. In keeping therewith, high coercive force media such as so-called metal fine powder tapes in which particles of ferromagnetic metals such as Fe, Co or Ni are used as the magnetic particles, or so-called metal thin-film tapes in which the ferromagnetic metal material is directly applied to the base film by evaporation or the similar methods, are being put to practical usage.

It is noted that, with the tendency towards using a high coercive force magnetic recording medium, an increasing demand is naturally raised on using the medium having a high saturation magnetic flux density. The ferrite material, so far used frequently as the head material, has only low saturation magnetic flux density, so that it cannot be used successfully with the high coercive force magnetic recording medium.

Under these circumstances, there has been evolved a composite type magnetic head having its magnetic core formed by a composite structure of ferrite or ceramics and a soft magnetic thin film having a high saturation magnetic flux density, with the magnetic gap being defined by the soft magnetic thin films abutted to each other. There has also been evolved a thin film magnetic head having its magnetic core and coils formed into thin films by the thin film technology, these films being overlapped with the insulating films in between for providing a multilayer structure.

As the soft magnetic thin film, it is known to use for example a magnetic thin film of an Fe-Al-Si type alloy or so-called Sendust having a high saturation magnetic flux density. However, since the magnetic thin film of the Fe-Al-Si type alloy has a electrical resistance $\rho$ as low as 80 micro-ohm-cm as characteristic of the alloy material, it has a deficiency that its magnetic properties are deteriorated on account of the eddy current loss for the high frequency range, especially in the megaherz range. Such deterioration in the magnetic properties in the high frequency range is unfavorable in view of the recent demand on high density recording or short-wavelength recording.

There are also known in the art metal-metalloid type amorphous alloys, such as Fe-B, Fe-Si-B or Fe-Co-Si-B, or metal-metal type amorphous alloys, such as Co-Zr or Co-Zr-Nb, that may be obtained by liquid or gas-phase rapid cooling methods. These alloys, however, are of the one-phase amorphous structure that may be said to be a homogeneous structure. The saturation magnetic flux density of these alloys is of the order of 10000 Gauss, while an electrical resistance $\rho$ thereof is indeed larger than that of the Sendust as the crystalline soft magnetic material but amounts to only 150 $\mu\Omega$-cm at most.

In general, for elevating the saturation magnetic flux density of the conventional soft magnetic thin film, it is necessary to increase the amount of the ferromagnetic metals, such as Fe or Co. The result is the low electrical resistance $\rho$ of the magnetic thin film. This implies that, with the soft magnetic thin film of the magnetic alloy material, the saturation magnetic flux density and the electrical resistance $\rho$ are intrinsically contrary to each other in nature, such that it has been difficult to realize the high saturation magnetic flux density and the high electrical resistance simultaneously.

SUMMARY OF THE INVENTION

It is a principal object of the present invention to provide a soft magnetic thin film having the high saturation magnetic flux density and the high electrical resistance simultaneously and capable of being used successfully with the high coercive force magnetic recording medium or for high frequency recording.

The present invention provides a novel amorphous soft magnetic thin film having a mixed and finely dispersed two-phase structure composed of a ferromagnetic amorphous phase and a non-magnetic amorphous phase. The soft magnetic film is obtained by using the combination of the transition metals and two different kinds of the metalloid or semi-conductor elements, herein B, C and Si, as the film composition, whereby the film is excellent in high frequency characteristics and may be applied in the field of the magnetic head adapted to be used with the high coercive force medium designed for short wavelength recording.

The soft magnetic thin film of the present invention is characterized in that it has a composition of MxLyJz wherein M stands for at least one of Fe, Co and Ni; L and J stand for mutually different elements selected from the group of B, C and Si; x, y, z stand for the contents of the respective elements in atomic percent, with $x+y+z=100$, $y+z \leq 10$, $x\neq0$, $y\neq0$ and $z\neq0$; and in that it has a hetero-amorphous two phase structure.

According to the soft magnetic thin film of the present invention, the two desirable but mutually contradictory properties, that is, the high electrical resistance and the high saturation magnetic flux density, may be achieved simultaneously.

DETAILED DESCRIPTION OF THE INVENTION

As a result of our prolonged eager researches into developing a soft magnetic thin film having the high saturation magnetic flux density and the high electrical resistance, the present inventors have found that the amorphous thin film composed mainly of transition metals and metalloids and having a two-phase structure containing finely dispersed two amorphous phases, namely the ferromagnetic amorphous phase and the non-magnetic amorphous phase, has a high electrical resistance $\rho$ of 300 to 4000 $\mu\Omega$-cm and a saturation magnetic flux density of ca. 15000 Gauss sufficiently compatible with the high coercive force, such that it exhibits excellent magnetic properties in a manner different from those of the conventional amorphous thin films.

On the basis of this finding, the present invention is characterized in that it has a composition of $M_x L_y J_z$ where M stands for at least one of Fe, Co and Ni; L and J stand for mutually different elements selected from the group of B, C and Si; x, y and z stand for the contents of the respective elements in atomic percent, with $x+y+z=100$, $Y+Z \geq 10$, $x \neq 0$, $y \neq 0$ and $z \neq 0$; and in that it has a hetero-amorphous two phase structure.

In the above formula, it is preferred that M be one or two or more of the 3d transition metal elements, that is, Fe, Co and Ni, that are ferromagnetic elements.

As the metalloid elements L and J, two of the elements are selected from the group of B, Si and C. These metalloid elements or semi-conductor elements are those that render the alloy amorphous. Above all, carbon C is effective to improve corrosion resistance, hardness and mechanical properties of the alloy while increasing its electrical resistance.

As the combinations of the metalloids L and J, it may be thought to use the three combinations, namely B-C, Si-C and Si-B. Most preferred are the combinations including carbon C, above all, the combination B-C, that has actually produced favorable results.

In the soft magnetic thin film of the present invention, it is necessary that the percentage $y+z$ of these metalloid elements L and J be not lower than 10 atomic percent. With the percentage $y+z$ lower than 10 atomic percent, the amorphous state cannot be realized.

Figure 1:
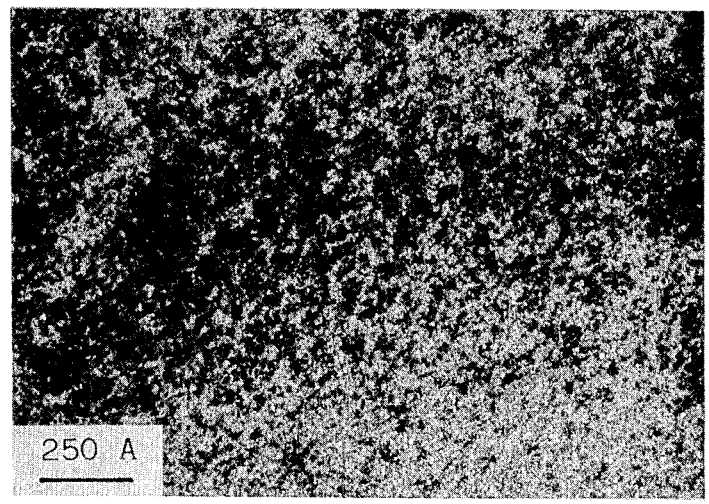
FIG. 1 is a transmission electron micrograph of an Fe-B-C type hetero-amorphous soft magnetic thin film.
Figure 2:
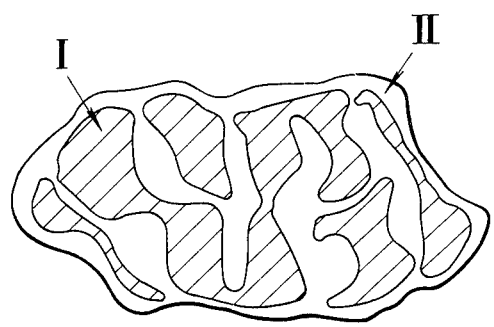
FIG. 2 is a schematic view showing the hetero-amorphous two phase structure.

In distinction from the well-known conventional one phase amorphous magnetic thin film, the soft magnetic thin film of the present invention is presumed to be a mixed two phase structure containing a ferromagnetic amorphous phase I (M-L-J) mainly composed of transition metal elements M, and a non-magnetic amorphous phase II (L-J) surrounding the phase I and consisting only of metalloid elements, as shown in FIG. 2. Such presumption is demonstrated by the dark field image obtained with a transmission electron microscope shown in FIG. 1. As may be seen from inspection of the electron micrograph of FIG. 1, light portions are finly intermixed with dark portions, thus indicating that the structure is the ultra-fine two phase hetero-amorphous structure having the crystal size of the order of 50 Å. An analysis with the electron ray diffraction method has revealed that both of these dark and light portions are of the amorphous phase.

In the preparation of the soft magnetic thin film of the present invention, rectangular plates of carbon compounds of B or Si or SiB compounds are arranged on a disk of a transition metal M as the target for sputtering. It is noted that, by increasing or decreasing the number of the rectangular plates, the percentatages x, y and z of the produced soft magnetic thin film can be controlled in such a fashion that the magnetic properties and/or the electrical resistance can be controlled appropriately according to the intended usage or application of the thin film.

As shown in FIG. 2, the soft magnetic thin film of the present invention is thought to consist in a two-phase intermixed structure containing a ferromagnetic amorphous phase I (M-L-J) mainly composed of transition metal elements M and a non-magnetic amorphous phase II (L-J) surrounding the phase I and composed only of metalloid elements. This structure gives rise to superior characteristics not realizable with the conventional one-phase amorphous structure.

Thus the ferromagnetic amorphous phase I of the low electrical resistance is fragmented by the non-magnetic amorphous phase II having the high electrical resistance, such that the thin film as a whole exhibits a high electrical resistance. In effect, the soft magnetic thin film of the present invention exhibits an electrical resistance of as high as 300 to 4000 $\mu\Omega$-cm.

Although fragmented electrically, the masses of the ferromagnetic amorphous phase I are separated from one the other by only a small distance, such that they are magnetically coupled to one another, the magnetic properties of the film as a whole, especially the saturation magnetic flux density, being higher than that of the one-phase amorphous thin film. In general, because of its crystalline magnetic anisotropy, the crystalline soft magnetic thin film, such as that of Sendust, exhibits uniaxial anisotropic and directional magnetic properties. Conversely, due to non-crystalline nature of the soft magnetic thin film and fine distribution of the respective masses of the ferro-magnetic amorphous phase I, the film exhibits magnetically isotropic soft magnetic properties in the film plane without regard to the angle. Such isotropic soft magnetic properties cannot be thought to be realizable with the conventional crystalline magnetic thin film or the one-phase amorphous thin film.

The practical utility of the soft magnetic thin film of the present invention having the above properties can be easily understood from analysis of a graphic representation of the characteristic regions thereof obtained by plotting the electrical resistance and the saturation magnetic flux density on the abscissa and the ordinate, respectively.

Figure 3:
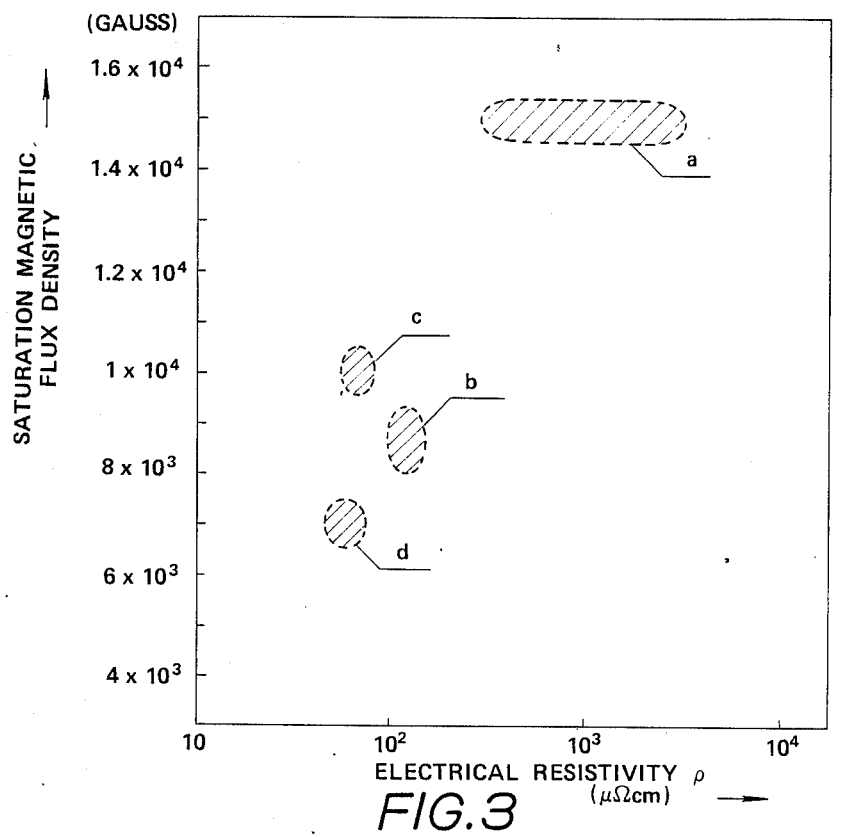
FIG. 3 shows the distribution of the characteristic regions of the soft magnetic thin film of the present invention, as compared to those of the conventional soft magnetic thin film.

FIG. 3 illustrates characteristic regions of the electric resistivity and the saturation magnetic flux density of a variety of soft magnetic thin films. In this figure, a, b, c and d represent these regions for the soft magnetic thin film according to the present invention, the one phase amorphous thin film, the Sendust thin film and the Permalloy thin film, respectively. Since the higher electric resistance and the higher saturation magnetic flux density are required of the soft magnetic thin film, it may be said that the more the regions are located towards right above in the drawing, the more superior these properties of the thin films. Seen in this light, the Permalloy thin film d is insufficient in both the electrical resistance and saturation magnetic flux density, such that it cannot be used successfully with a metal fine powder tape having the coercive force of ca. 1500 Oe. With the one-phase amorphous thin film b or the Sendust thin film the saturation magnetic flux density is about 10000 Gauss compatible with the use with metal fine powder tapes. However, the electrical resistance of these films is insufficient and amounts to only 100 $\mu\Omega$-cm. On the other hand, the soft magnetic thin film a having the hetero-amorphous two-phase structure has an electrical resistance which is significantly larger than that of the one-phase amorphous thin film or the Sendust thin film and a saturation magnetic flux density which is also larger than that of these films.

It is seen from above that, with the soft magnetic thin film of the present invention composed of the transition metals and two metalloid elements selected from the group of B, C and Si and having the hetero-amorphous two phase structure of the ferro-magnetic amorphous phase and the nonmagnetic amorphous phase, the two mutually contradictory properties, namely the high electrical resistance and the high saturation magnetic flux density, may be attained simultaneously.

It is therefore possible to provide a soft magnetic thin film that is low in eddy current losses and superior in high frequency characteristics and that may be applied for example to the preparation of a magnetic head for short wavelength recording.

The soft magnetic thin film of the present invention has a smaller coercive force and a larger saturation magnetic flux density than those of the Sendust or one phase amorphous films, so that it is sufficiently compatible with high coercive force metal fine powder tapes.

In addition, the soft magnetic thin film of the present invention is highly advantageous in that, although it is an isotropic soft magnetic material, it is not crystalline in structure and has no uniaxial anisotropy due mainly to crystalline magnetic anisotropy, so that the working direction need not be when working the film into the magnetic head.

The description with reference to a specific Example of the present invention is given hereinbelow. It should be noted that the Example is given only by way of illustration and is not intended to limit the scope of the present invention.

EXAMPLE

An $Fe_x$ $B_y$ $C_z$ type amorphous film, where $x+y+z=100$, was prepared using an RF magnetron sputtering method.

An Fe disk having a diameter of 100 mm and a thickness of 2 mm was used as a target for sputtering and a required number of small plates, each cut to a size of 5 mm $\times$ 5 mm $\times$ 2 mm, of a compound having the formula $B_4C$, was placed on the disk. A photo-serum or glass was used as a substrate.

The film was prepared under the following sputtering conditions except for the argon gas pressure and the BC plate area ratio on the target.

Sputtering Conditions

| | |
|---|---|
| Distance between polar plates | 40 mm |

| -continued | |
|---|---|
| Preliminary Sputtering Time | 1 hour |
| Main Sputtering Time | 4 hours |
| Ar flow rate | 100 msc cm |
| Vacuum reached | $1 \times 10^{-6}$ Torr |
| Incidence Wattage | 200 Watt |
| Reflection Wattage | 20 Watt |
| Anode Voltage | 2.2 kV |
| Anode Current | 160 mA |

An X-ray analysis was used for determining whether the produced sputtering film was crystalline or amorphous, while the electron spectroscopy chemical analysis (ESCA) and an X-ray microprobe analyzer (XMA) were used for film composition analysis.

Various samples were produced in accordance with the above process while changing the area ratio of the BC plates on the target, and the electrical resistivity $\rho$, saturation magnetic flux density Bs, coercive force Hc, the crystallization temperature Tx and the Curie temperature Tc of these samples were measured.

Figure 4:
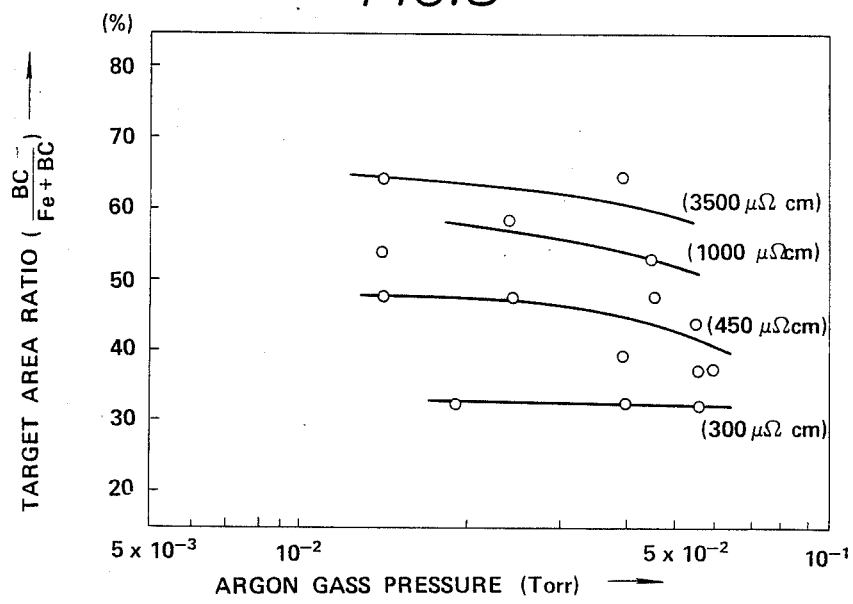
FIG. 4 is a chart showing the target ratio and argon gas pressure dependency of the electrical resistivity in the Fe-B-C type soft magnetic thin film.

FIG. 4 shows changes in the electrical resistivity $\rho$ caused by changes in the argon gas pressure and in the area ratio of the BC plates on the target. The electrical resistivity $\rho$ was measured with a four terminal method.

It is seen from FIG. 4 that the electrical resistivity $\rho$ is increased with increase in the area ratio of the BC plates on the target without regard to the argon gas pressure. This supports the fact that the electrical resistance is increased by the non-magnetic amorphous phase consisting essentially of B-C. It is also seen from FIG. 4 that, even with the area ratio or relative area of the BC plates of 30 to 40 percent, it is possible to achieve an electrical resistivity of 300 to 400 $\mu\Omega$-cm significantly higher than that of the one-phase amorphous or Sendust films, while it is also possible to achieve a high electrical resistivity of 4000 $\mu\Omega$-cm, if so desired.

Figure 5:
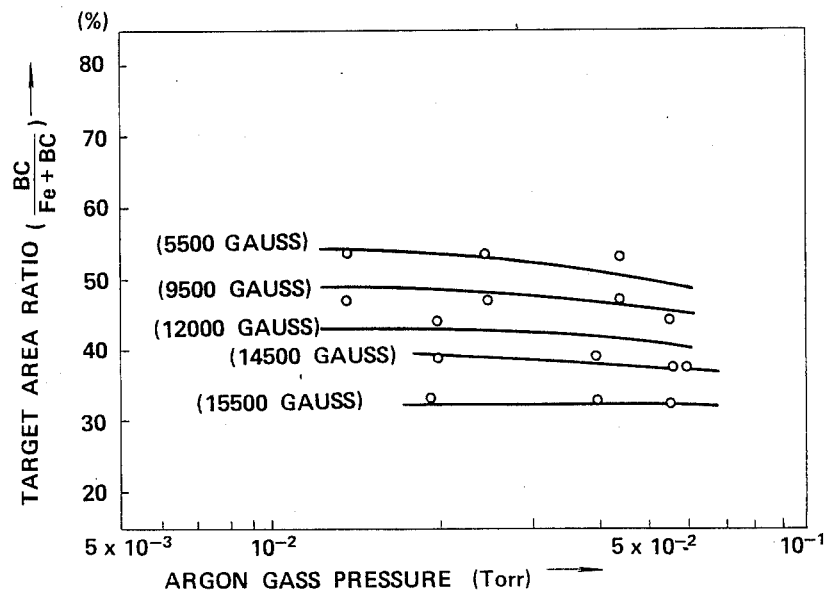
FIG. 5 is a chart showing the target ratio and argon gas pressure dependency of the saturation magnetic flux density Bs.

Referring to FIG. 5, more favorable values of the saturation magnetic flux density Bs may be obtained with the lower values of the relative area of the BC plates. However, the saturation magnetic flux density of 14000 to 15000 Gauss may be achieved with the relative area of the BC plates of 30 to 40 percent. Since this value is in excess of that of the Sendust or the one phase amorphous film, it is apparent that both the electrical resistance and the saturation magnetic flux density may assume favorable values for this domain of the relative area of the BC plates.

Figure 6:
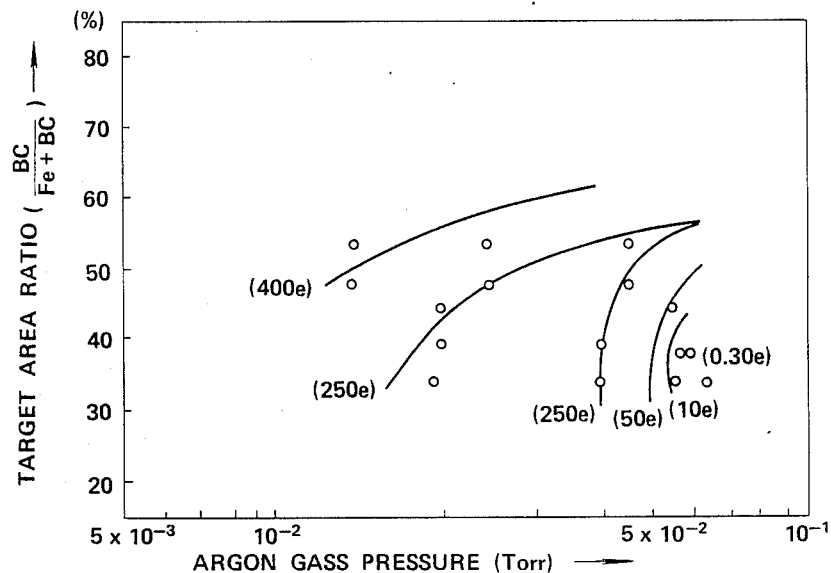
FIG. 6 is a chart showing the target ratio and argon gas pressure dependency of the coercive force Hc.

Referring to FIG. 6, the coercive force Hc depends on the argon gas pressure, as shown in FIG. 6, and assumes a small value of not higher than 5 Oe (Hc$\leq$5 Oe) for the argon gas pressure of not lower than $5 \times 10^{-2}$ Torr, while an extremely small value of the coercive force Hc of not higher than 0.3 Oe may be achieved under certain conditions. This value of the coercive force is that obtained before the application of heat processing and may be said to be specific to the inventive film as compared with the Sendust film for which heat processing is unexceptionally required for lowering the coercive force. This implies that any special heat treatment may be dispensed with, favorable for the procecution of the process steps.

It is noted that the vibrating sample magnetometer (VSM) was used for measuring the magnetic properties inclusive of the aforementioned saturation magnetic flux density Bs and the coercive force Hc.

For investigating into the thermal properties of the hetero-amorphous soft magnetic thin film of the present invention, the crystallization temperature Tx and the Curie temperature Tc of the produced film were also measured. Temperature changes in the magnetic balance of the Faraday type were used for making these measurements.

Figure 7:
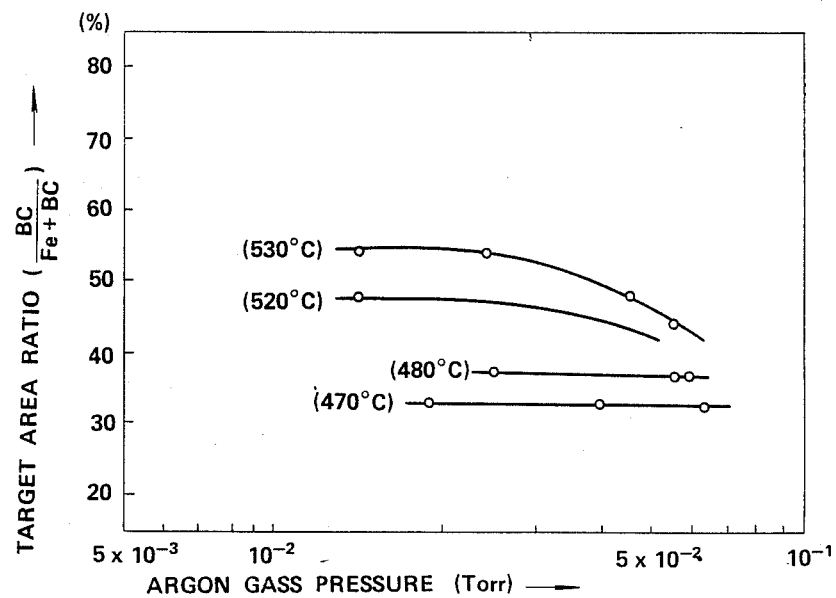
FIG. 7 is a chart showing the target ratio and argon gas pressure dependency of the crystallization temperature Tx.
Figure 8:
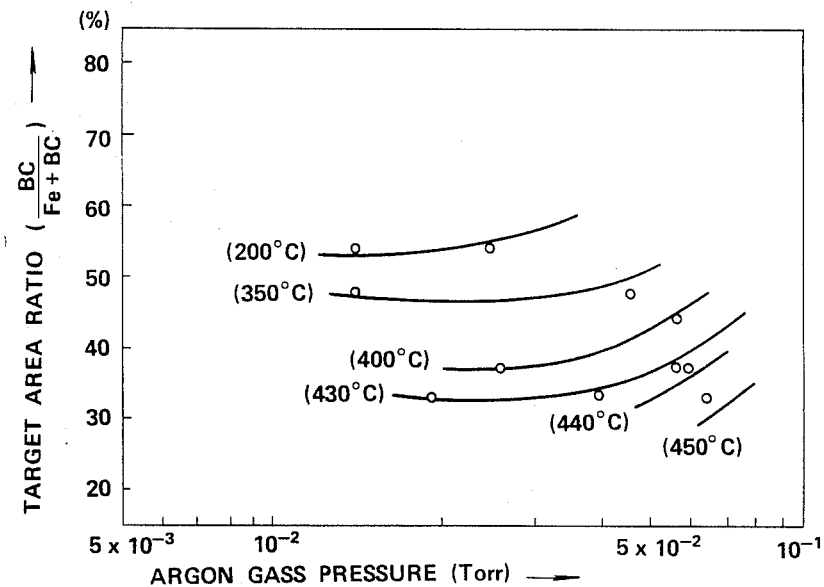
FIG. 8 is a chart showing the target ratio and argon gas pressure dependency of the Curie temperature Tc.

Of these thermal properties, the crystallization temperature Tx may be used an index of thermal constraints when working the present film into a magnetic head. The higher crystallization temperature is preferred. When comparing the Curie temperature Tc and the crystallization temperature Tx to each other, when TC>Tx, a more complex heat treatment is required for eliminating magnetic anisotropy. Thus, Tx>Tc is more favorable in consideration that magnetic permeability may be improved under such temperature condition by heat treatment. Checking the results of the measurement in this light, the crystallization temperature Tx has assumed rather high values of 470° to 530° C., as indicated in FIG. 7. Comparing these results with the measured results of the Curie temperature Tc shown in FIG. 8, the condition Tx>Tc prevails in any case, thus indicating that no difficulties would be presented in heat processing.

Based on the above results, a hetero-amorphous soft magnetic thin film having the composition $Fe_{61}B_{32}C_7$, wherein the subscripts stand for atomic percent, was prepared.

Figure 9:
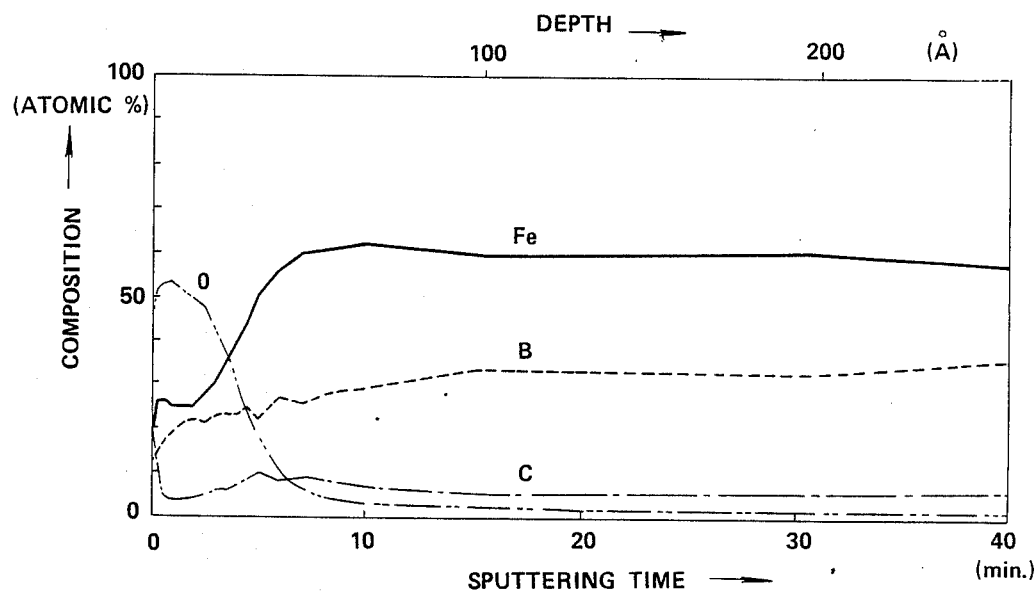
FIG. 9 is a chart showing the distribution of the composition of the Fe-B-C type soft magnetic thin film along the film thickness.

The state of composition of the soft magnetic thin film along the film depth was investigated. It was thus revealed that the region up to about 50 Å deep from the film surface was subjected to oxidation and thus contained oxygen, as shown in FIG. 9, but the state of composition remained stable in the deeper region, thus providing the film bearing the prescribed atomic percentages.

Figure 10:
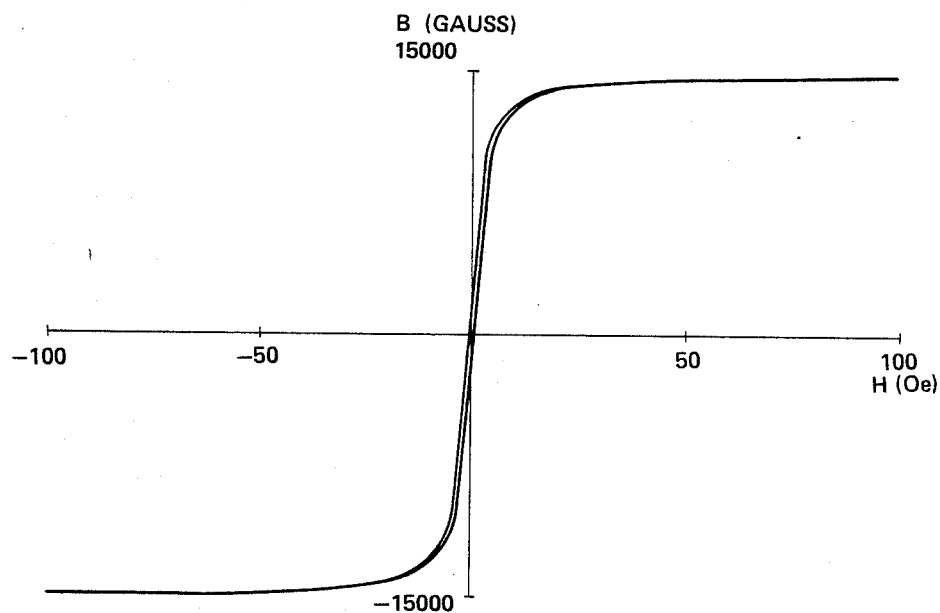
FIG. 10 is a chart showing a hysteresis curve of the Fe-B-C type soft magnetic thin film.

A hysteresis curve of the produced soft magnetic thin film was measured and exhibited favorable soft magnetic properties, as indicated in FIG. 10. Thus the high saturation magnetic flux density Bs of about 15000 Gauss and the extremely low coercive force Hc of 0.3 Oe were obtained. The soft magnetic properties were magnetically isotropic and were unchanged no matter in which direction the measurement was made within the plane of the film samples. This feature is highly advantageous when the film is worked into the magnetic head, for instance, since it is no longer necessary to consider the orientation during working.

Figure 11:
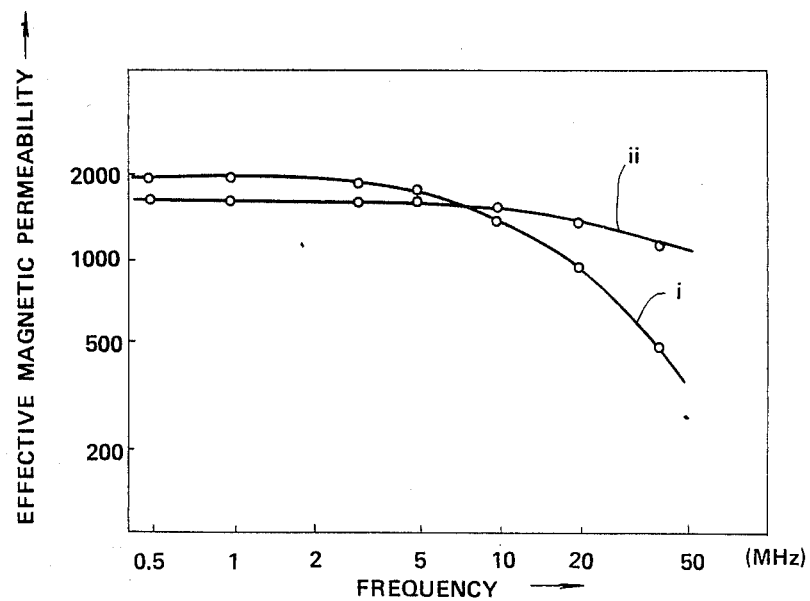
FIG. 11 is a chart showing the frequency response of the effective magnetic permeability of the Fe-B-C type soft magnetic thin film in comparison with that of Sendust.

The frequency response of the effective magnetic permeability of the aforementioned hetero-amorphous soft magnetic thin film was measured using a permeameter in the form of a figure eight. The results are shown in FIG. 11, wherein a curve (i) stands for magnetic permeability of a Sendust thin film (obtained after annealing in vacuum at 550° C. for one hour; film thickness, 4 μm; saturation magnetic flux density 10000 Gauss), while a curve (ii) stands for magnetic permeability of a thin film of a composition $Fe_{61}B_{32}C_7$ (film thickness, 4 μm) according to an embodiment of the present invention.

It is seen from this figure that the magnetic permeability of the $Fe_{61}B_{32}C_7$ thin film presents a flatter frequency response than the Sendust thin film and that, while being slightly low in the low frequency range, the magnetic permeability of the $Fe_{61}B_{32}C_7$ thin film becomes markedly higher than that of the Sendust film for the frequency range higher than 8 MHz. This is an indication that the high frequency characteristic may be significantly improved by the reduction in the eddy current losses due to the high electrical resistance. Thus it may be expected that a considerable practical advantage may be derived when applying the inventive thin film to a magnetic head employed in a digital VTR adapted for digital recording of video signals.

What is claimed is:

1. A soft magnetic thin film having a composition MxLyJz, wherein

M is at least one element selected from the group consisting of Fe, Co and Ni,

L and J are elements selected from the group consisting of B, C and Si and that are different from one another, and X, Y, Z are the percentages of the respective elements in atomic percent and $x+y+z=100$, $y+z \geq 10$, $x \neq 0$, $y \neq 0$, $z \neq 0$, and said film consists essentially of first regions of an M-based amorphous phase precipitated in second regions of an L-J amorphous phase having high electrical resistivity.

2. A soft magnetic thin film according to claim 1 which has been prepared by sputtering using a first solid target consisting essentially of M and a second solid target consisting essentially of a compound of L and J.

3. A soft magnetic thin film according to claim 2 wherein said first solid target consists essentially of Fe and said second solid target consists essentially of $B_4C$.

4. A soft magnetic thin film according to claim 1 wherein the crystallization temperature Tx is higher than the Curie temperature Tc.

5. A soft magnetic thin film according to claim 2 wherein the sputtering is carried out under an argon gas pressure not lower than $5 \times 10^{-2}$ Torr.

6. A soft magnetic thin film according to claim 1, said film having an electrical resistivity not less than approximately 300 μΩcm.

7. A soft magnetic thin film according to claim 6, said film having an electrical resistivity of approximately 300 to about 4000 μΩcm.

* * * * *